United States Patent [19]

Shiozumi et al.

[11] Patent Number: 4,734,766

[45] Date of Patent: Mar. 29, 1988

[54] METHOD AND SYSTEM FOR LOCATING AND INSPECTING SEAM WELD IN METAL SEAM-WELDED PIPE

[75] Inventors: Motoji Shiozumi; Yuichiro Asano; Akira Torao, all of Chiba, Japan

[73] Assignee: Kawasaki Steel Corporation, Hyogo, Japan

[21] Appl. No.: 897,525

[22] Filed: Aug. 18, 1986

[30] Foreign Application Priority Data

Aug. 19, 1985 [JP] Japan ................................ 60-180531
Dec. 10, 1985 [JP] Japan ................................ 60-276039

[51] Int. Cl.⁴ ............................................ H04N 7/18
[52] U.S. Cl. .................................... 358/106; 358/101; 382/8; 356/376
[58] Field of Search ................ 358/101, 106, 107, 93, 358/100, 112; 250/560, 561; 356/376; 219/124.34; 382/8

[56] References Cited

U.S. PATENT DOCUMENTS

| | | | |
|---|---|---|---|
| 4,021,840 | 5/1977 | Ellsworth et al. | 358/100 X |
| 4,242,702 | 12/1980 | Kani et al. | 358/106 |
| 4,305,096 | 12/1981 | Yokoshima et al. | 358/101 |
| 4,493,968 | 1/1985 | Brown | 356/376 X |
| 4,498,778 | 2/1985 | White | 356/376 |
| 4,567,347 | 1/1986 | Ito et al. | 356/376 X |

*Primary Examiner*—Howard W. Britton
*Assistant Examiner*—Victor R. Kostak
*Attorney, Agent, or Firm*—Austin R. Miller

[57] ABSTRACT

A seam locating system includes a laser beam scanning means for scanning a laser beam through a plurality of circumferentially aligned scanning points. The system includes means for forming a pattern image of reflected laser beam at each scanning points and means for forming a single-frame video image of the pattern image for each scanning point. A video signal processing circuit selects one or more scanning lines suitable for locating irregularities in the angle of reflection of the laser beam, for locating the scanning line in each frame with the maximum width over which the luminosity of the video signal is higher than a given threshold, for deriving a threshold value to be compared with the maximum width of each frame and for deriving the center position of the seam based on the comparison of the maximum width of each frame and the threshold value and the address of each frame, which address is indicative of the circumferential position of the corresponding scanning point. The seam locating system set forth above is not influenced by scale or the like which reflect the laser beam irregularly but with high luminosity by suitably selecting the scanning lines in each frame of video data. The seam locating system may further include means for feedback controlling the laser beam scanning means relative to the derived center position of the welded seam. Furthermore, the seam locating system according to the invention is applicable to seam-welded pipe annealing for automatically positioning the anneal device over the seam or for flaw detection in the welded seam.

32 Claims, 13 Drawing Figures

METHOD AND SYSTEM FOR LOCATING AND INSPECTING SEAM WELD IN METAL SEAM-WELDED PIPE

BACKGROUND OF THE INVENTION

1. Field of the Invention

The present invention relates generally to a method and a system for accurately locating the welded seam of a seam-welded metal pipe. More specifically, the invention relates to a method and system for locating the seam in a seam-welded metal pipe optically by means of a laser beam. In addition, the invention relates to a method and system for inspecting the welded seam in the seam-welded pipe following location thereof by means of the seam locating system according to the invention.

2. Description of the Prior Art

The manufacture of seam-welded pipe requires numerous treatment steps and tests on the produced pipe. Such treatment includes annealing of the welded seam and such tests include inspection of the seams. Seam annealing and inspection require accurate location of the finished seam in the seam-welded pipe.

Before the welding bead is removed from the seam, the seam is relatively easy to find because of the unevenness of the outer pipe surface. However, after removing the welding bead, it becomes more difficult to locate the seam since the pipe surface is then essentially smooth. On the other hand, in the seam-welded pipe industry, it is normal during manuafacture to remove the welding bead during welding. Therefore, when the pipe is transferred for annealing and seam inspection, the welding bead is already removed. This makes it difficult to find the seam.

Conventionally, various approaches have been proposed for accurate location of the seam of a seam-welded metal pipe. One approach is to optically locate the seam by means of a light beam or laser beam. This seam position locating process and/or system was proposed in the Japanese Patent First Publication (Tokkai) Showa No. 59-108903, published on June 23, 1984, which has been assigned to the owner of the present invention. In the system disclosed, a laser beam is irradiated onto the outer surface of the seam-welded metal pipe. The reflected beam is received and analyzed to distinguish between unwelded section of the pipe and the seam depending upon changes in the intensity and/or orientation of the reflected beam. This system is effective for locating the seams on a seam-welded metal pipe. This system is especially effective for accurately locating the seams before annealing.

However, a difficulty is encountered after annealing since the surface of the pipe tends to be marred by scale marks, scratch marks and so forth during the annealing process. Such scale marks, scratches and so forth make it more difficult to optically distinguish between the seam and the unwelded sections. Since seam inspection is usually performed after seam annealing, some difficulty in accurately locating the seam for inspection persists.

SUMMARY OF THE INVENTION

Therefore, it is an object of the present invention to provide a method and a system for locating a seam on a seam-welded metal pipe despite the presence of scale marks, scratches and so forth on the pipe surface.

Another object of the present invention is to provide a method and process for inspecting the welded section located by the method and system of the invention.

In order to accomplish the above-mentioned and other objects, a seam locating system, according to the present invention, includes a laser beam scanning means for scanning a laser beam through a plurality of circumferentially aligned scanning points. The system includes means for forming a pattern image of reflected laser beam at each scanning point and means for forming a single-frame video image of the pattern image for each scanning point. A video signal processing circuit selects one or more scanning lines suitable for locating irregularities in the angle of reflection of the laser beam, for locating the scanning line in each frame with the maximum width over which the luminosity of the video signal is higher than a given threshold, for deriving a threshold value to be compared with the maximum width of each frame and for deriving the center position of the seam based on the comparison of the maximum width of each frame and the threshold value and the address of each frame, which address is indicative of the circumferential position of the corresponding scanning point.

The seam locating system set forth above is not influenced by scale or the like which reflects the laser beam irregularly but with high luminosity by suitably selecting the scanning lines in each frame of video data.

The seam locating system, according to the invention, further includes means for feedback controlling the laser beam scanning means relative to the derived center position of the welded seam.

Furthermore, the seam locating system according to the invention is applicable to seam-welded pipe annealing for automatically positioning the annealing device over the seam or for flaw detection in the welded seam.

According to one aspect of the invention, a system for locating a seam on an elongated seam-welded pipe, comprises first means for scanning a laser beam across the surface of the seam-welded pipe through a plurality of scanning points aligned circumferentially of the pipe, second means for receiving the laser beam reflected from each of the scanning points on the pipe surface, third means for recording the received laser beam in the form of a video image, one frame for each scanning point, the video image containing luminosity data for a predetermined number of pixels in each of a predetermined number of scan lines in each frame, fourth means for locating the width of a bright area in each frame, which bright area is made up of pixels of luminosity exceeding a predetermined value, fifth means for comparing the width of the bright area in each frame with a threshold value and producing a binary signal of value "1" when the width of the bright area is greater than the threshold value and of value "0" otherwise, sixth means for deriving a moving average of the values of the binary signals for a given number of successive frames, determining the frames over which the averaged value was maximized and for recording the address numbers of the first and the last frames where the maximum average values were obtained, and seventh means for deriving the location of the center of the welded seam by finding the address of the frame intermediate the first and last frames.

By processing the video image data obtained by the third means in the process set forth above, error of detection of the seam center due to noise caused by scale or scales or so forth formed on the surface of the pipe can be successfully avoided.

The seam locating system further comprises eighth means for locating the greatest bright area width among the video images for all of the scanning points and deriving the threshold value as a function of the geratest bright area width.

Preferably, the fourth means checks the width of the section of each scan line lying within the bright area of each frame when locating the width of bright area in each frame. The fourth means includes a memory for storing the width of the bright area of each frame together with a corresponding address of the scan line on which the width of bright area of each frame was measured.

On the other hand, the seventh means assumes the center of the seam to lie at the center of the frame intermediate the first and last frames.

In the practical embodiment, the first means comprises a sensor head transmitting the laser beam toward the surface of the pipe, position sensor means for locating the position of the sensor head relative to the pipe and a drive means for driving the sensor head.

The seam locating system further comprises ninth means for feedback controlling the drive means so as to hold the sensor head directly over the center of the seam.

In practical application, the seam locating system as set forth above cooperates with a flaw detector for inspecting welded seams so as to enable the flaw detector to remain in alignment with the center of the seam. The flaw detector may comprise an ultra-sonic flaw detector.

According to another aspect of the invention, a method is provided for locating a seam on an elongated seam-welded pipe, comprising the steps of:

scanning a laser beam across the surface of the seam-welded pipe through a plurality of scanning points aligned circumferentially of the pipe;

receiving the laser beam reflected from each of the scanning points on the pipe surface;

recording the received laser beam in the form of a video image, one frame for each scanning point, the video image containing luminosity data for a predetermined number of pixels in each of a predetermined number of scan lines in each frame;

locating the width of a bright area in each frame, which bright area is made up of pixels of luminosity exceeding a predetermined value;

comparing the width of the bright area in each frame with a threshold value and producing a binary signal of value "1" when the width of the bright area is greater than the threshold value and of value "0" otherwise;

deriving a moving average of the values of the binary signals for a given number of successive frames, determining the frames over which the averaged value was maximized and for recording the address numbers of the first and the last frames where the maximum average values were obtained; and deriving the location of the center of the welded seam by finding the address of the frame intermediate the first and last frames.

The method further comprises the step of locating the greatest bright area width among the video images for all of the scanning points and deriving the threshold value as a function of the greatest bright area width. The step of locating the width of the bright area is performed by checking the width of the section of each scan line lying within the bright area of each frame when locating the width of bright area in each frame. The step of locating the width of the bright area in each frame includes a step of storing the width of the bright area of each frame with a corresponding address of the scan line from which the width of bright area of each frame was obtained.

On the other hand, the position of the center of the seam is assumed to be the center of the frame intermediate the first and last frames. Furthermore, the method for locating the seam further comprises the step of locating the position of a sensor head which transmits the laser beam in relation to the pipe and feedback controlling the sensor head position based on the derived position of the center of the seam.

According to a further aspect of the invention a system for locating flaws in a seam of an elongated seam-welded pipe comprises:

a flaw detector for inspecting the pipe in order to detect flaws in the welded seam of the pipe; and a servo-system for the flaw detector for centering the flaw detector over the seam position, which servo system comprises:

first means for scanning a laser beam across the surface of the seam-welded pipe through a plurality of scanning points aligned circumferentially of the pipe;

second means for receiving the laser beam reflected from each of the scanning points on the pipe surface;

third means for recording the received laser beam in the form of a video image, one frame for each scanning point, the video image containing luminosity data for a predetermined number of pixels in each of a predetermined number of scan lines in each frame;

fourth means for locating the width of a bright area in each frame, which bright area is made up of pixels of luminosity exceeding a predetermined value;

fifth means for comparing the width of the bright area in each frame with a threshold value and producing a binary signal of value "1" when the width of the bright area is greater than the threshold value and of value "0" otherwise;

sixth means for deriving a moving average of the values of the binary signals for a given number of successive frames, determining the frame over which the averaged value was maximized and for recording the address numbers of the first and the last frames where the maximum average values were obtained; and seventh means for deriving the location of the center of the welded seam by finding the address of the frame intermediate the first and last frames.

According to a still further aspect of the invention, a method for locating flaws in a seam in an elongated seam-welded pipe comprises the steps of:

scanning a laser beam across the surface of the seam-welded pipe through a plurality of scanning points aligned circumferentially of the pipe;

receiving the laser beam reflected from each of the scanning points on the pipe surface;

recording the received laser beam in the form of a video image, one frame for each scanning point, the video image containing luminosity data for a predetermined number of pixels in each of a predetermined number of scan lines in each frame;

locating the width of a bright area in each frame, which bright area is made up of pixels of luminosity exceeding a predetermined value;

comparing the width of the bright area in each frame with a threshold value and producing a binary signal of value "1" when the width of the bright area is greater than the threshold value and of value "0" otherwise;

deriving a moving average of the values of the binary signals for a given number of successive frames, determining the frames over when the averaged value was maximized and for recording the address numbers of the first and the last frames where the maximum average values were obtained;

deriving the location of the center of the welded seam by finding the address of the frame intermediate the first and last frames and positioning a flaw detector based on the derived position of the center of the seam so as to center the flaw detector over the seam.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings:

FIG. 3 comprising

DESCRIPTION OF THE PREFERRED EMBODIMENT

Figure 1:
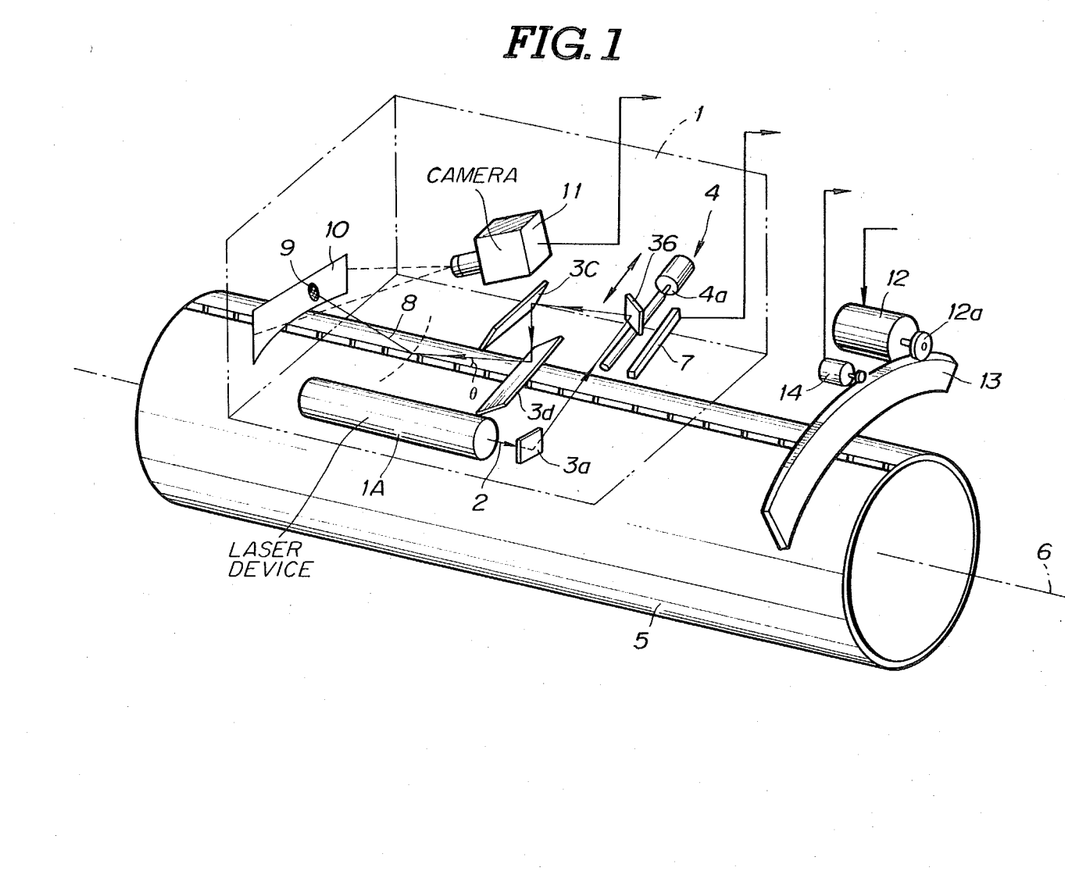
FIG. 1 is a fragmentary perspective view of the preferred embodiment of a seam locating system according to the invention.

Referring now to the drawings, particularly to FIG. 1, the preferred embodiment of a seam locating system according to the present invention has a sensor head 1. The sensor head 1 has a laser device 1A. In the preferred embodiment, a He-Ne laser device is used as the laser device 1A. The laser device 1A generates a laser beam 2 at a wavelength of 633 nm. The laser device 1A transmits the laser beam 2 toward a deflector 3a. The reflecting surface of the deflector 3a lies oblique to the axis of the laser beam 2. The angle of the obliquity of the reflecting surface of the defector 3a with respect to the axis of the laser beam 2 is set to about 45°. Therefore, the laser beam 2 is deflected through about 90° by the deflector 3a and directed to a deflector 3b of a beam scanner 4. The deflector 3b is pivotable about a vertical axis and is actuated by the beam scanner 4. The deflector 3b has a reflecting surface lying oblique to the axis of the laser beam from the deflector 3a. The laser beam 2 is deflected by the deflector 3b to a deflector 3c which is inturn directs it to yet another deflector 3d.

As will be seen from FIG. 1, the deflectors 3a and 3b deflect the laser beam 2 within the horizontal plane, while the deflectors 3c and 3d deflect the laser beam 2 within a vertical plane.

The beam scanner 4 has an actuation rod 4a extending perpendicular to the axis of a seam-welded metal pipe 5. The free end of the actuation rod 4 is connected to the deflector 3b to adjust the lateral position of the reflecting surface of the deflector 3b relative to the laser beam axis so as to hold the laser beam 2 parallel to the axis 6 of the seam-welded metal pipe 5. In practice, the actuation rod 4a can adjust the deflector 3b so as to shift the laser beam axis across a lateral range of ±25 mm.

The deflector 3c deflects the laser beam 2 from the deflector 3b of the laser scanner 4 vertically through 90° toward the deflector 3d. The deflector 3d lies directly beneath the deflector 3c and has a reflecting surface oblique to the horizontal plane. The obliquity of the deflector 3d is selected so that the laser beam 2 contacts the outer surface of the seam-welded metal pipe at an angle of incidence $\theta$. In practice, the angle of incidence $\theta$ is set greater than or equal to 70° and less than or equal to 90°.

The laser device 1A, the deflectors 3a, 3b, 3c and 3d together form a laser beam scanning device. With the arrangement set forth above, the laser beam 2 scans across a small angular sector of the pipe 5. This is essentially equivalent to scanning with a laser beam perpendicular to the axis 6 of the pipe.

A potentiometer 7 cooperates with the laser scanner 4 to monitor the position of the laser beam 2 on the surface of the pipe 5. The potentiometer 7 produces a scanning position indicative signal representative of the position of the laser beam 2 on the surface of the pipe 5.

The laser beam 2 reflects from the surface of the seam-welded metal pipe 5. The reflected laser light 8 irradiates a reflection pattern screen 10, on which a reflection pattern 9 is thereby formed. A solid-state camera 11 opposing the reflection pattern screen 10 records the reflection pattern image in the form of a video signal. Each such frame of the video signal containing pattern image data is transmitted to a signal processing circuit which will be described herebelow, together with the scanning position indicative signal from the potentiometer 7.

Figure 2:
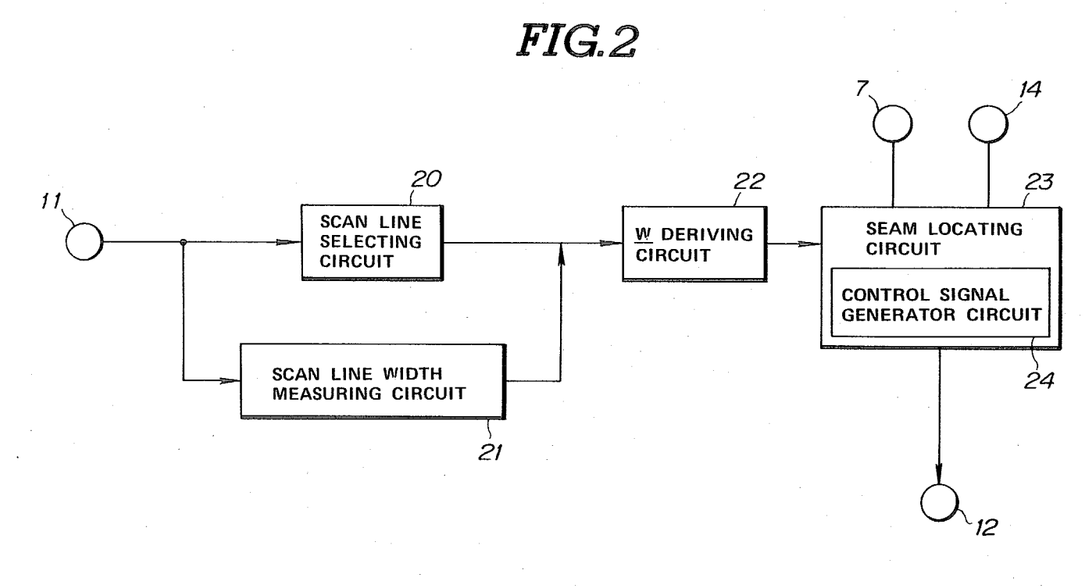
FIG. 2 is a functional block diagram of general operation of the preferred embodiment seam locating system.

FIG. 2 schematically shows the signal processing circuit in the preferred embodiment of the seam locating system according to the invention. The signal processing circuit has a scanning line selecting circuit 20. The scan line selecting circuit 20 receives each frame of the video signal detects which horizontal scan lines have at least one pixel of luminosity greater than or equal to a predetermined luminosity value. The signal processing circuit also has a scan line width locating circuit 21. The scan line width locating circuit 21 receives the video signal from the solid-state camera 11 and also receives the output of the scan line selecting circuit 20. The output of the scan line selecting circuit 20 will be hereafter referred to as "selected scan line indicative signal". The scan line width locating circuit 21 is adapted to detect the width w of the contiguous section of each of horizontal scanning lines within which the luminosity is higher than or equal to the predetermined luminosity value. The section of the horizontal scan line where the luminosity is greater than or equal to the predetermined luminosity will be hereafter referred to as "effective section". The scan line width locating circuit outputs a signal indicative of the width w of the effective section will be hereafter referred to as "effective width indicative signal".

The selected scan indicative signals and the effective width indicative signals for each line are input to a maximum width W deriving circuit 22. The maximum width deriving circuit 22 finds the effective section with the greatest width W in the single, current frame of pattern data.

It should be appreciated that the solid-state camera 11 picks-up a pattern image 9 from the reflection pattern screen 10 at each scanning point in each cycle of scanning, in which laser beam 2 scans the surface of the seam welded metal pipe 5 across its full lateral range. Each time a pattern image 9 is recorded, the signal processing circuit detects the selected horizontal scan lines and the effective width w of respective horizontal lines and derives the maximum effective width W. Specifically, in the preferred embodiment, the above signal processing is repeated for 50 scanning points, i.e. 50 times during each scanning cycle.

The maximum width locating circuit 22 produces an output signal which will be hereafter referred to as "maximum width W indicative signal". The maximum width indicative signal is fed to a seam locating circuit 23. The seam locating circuit 23 is also connected to the potentiometer to receive therefrom the scanning position indicative signals representative of the scanning points at which the current pattern images is produced. The seam locating circuit 23 is also connected to another potentiometer 14 which is employed to monitor the position of a sensor head 1. As shown in FIG. 1, the potentiometer 14 has a gear section 14a engaging gear teeth in a ring gear 13 driven according to the angular position of the sensor head 1. The output of the potentiometer 14 serves as a head position indicative signal. The head position indicative signal of the potentiometer 14 is fed to the seam locating circuit 23.

The seam locating cicuit 23 deduces the location of the center of the welded seam in the pipe 5 based on the selected scan line indicative signals and the maximum width indicative signals. Derivation of the seam center position involves averaging the seam center location values obtained for numerous longitudinally spaced points in order to damp the influence of abnormal seam center location values. Furthermore, the seam locating circuit 23 derives the angular or lateral offset of the center of the seam from the central axis of the sensor head 1. The seam locating cirucit 23 outputs an offset indicative signal to a control signal generator circuit 24. The control signal generator circuit 24 derives a control signal used to center the sensor head 1 over the seam.

The control signal of the control signal generator circuit 24 is fed to a sensor head driving motor 12 which has a gear section 12a engaging the gear teeth of the ring gear 13. The sensor head driving motor 12 is thus driven in the direction and through the distance ordered by the control signal to shift the sensor head 1 until its central center axis is aligned with the center of the seam.

Figure 3A:
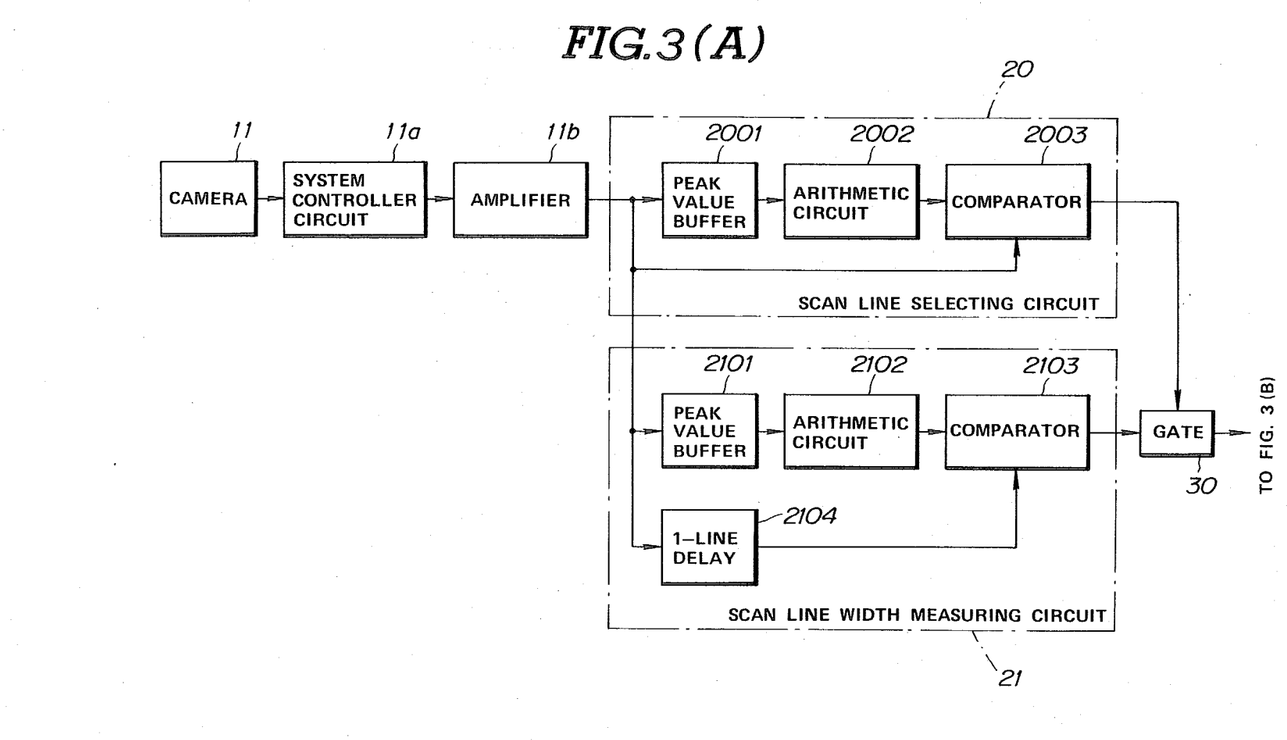
FIGS. 3(A) and 3(B) is a more detailed block diagram of a video signal processing circuit of FIG. 2.
Figure 3B:
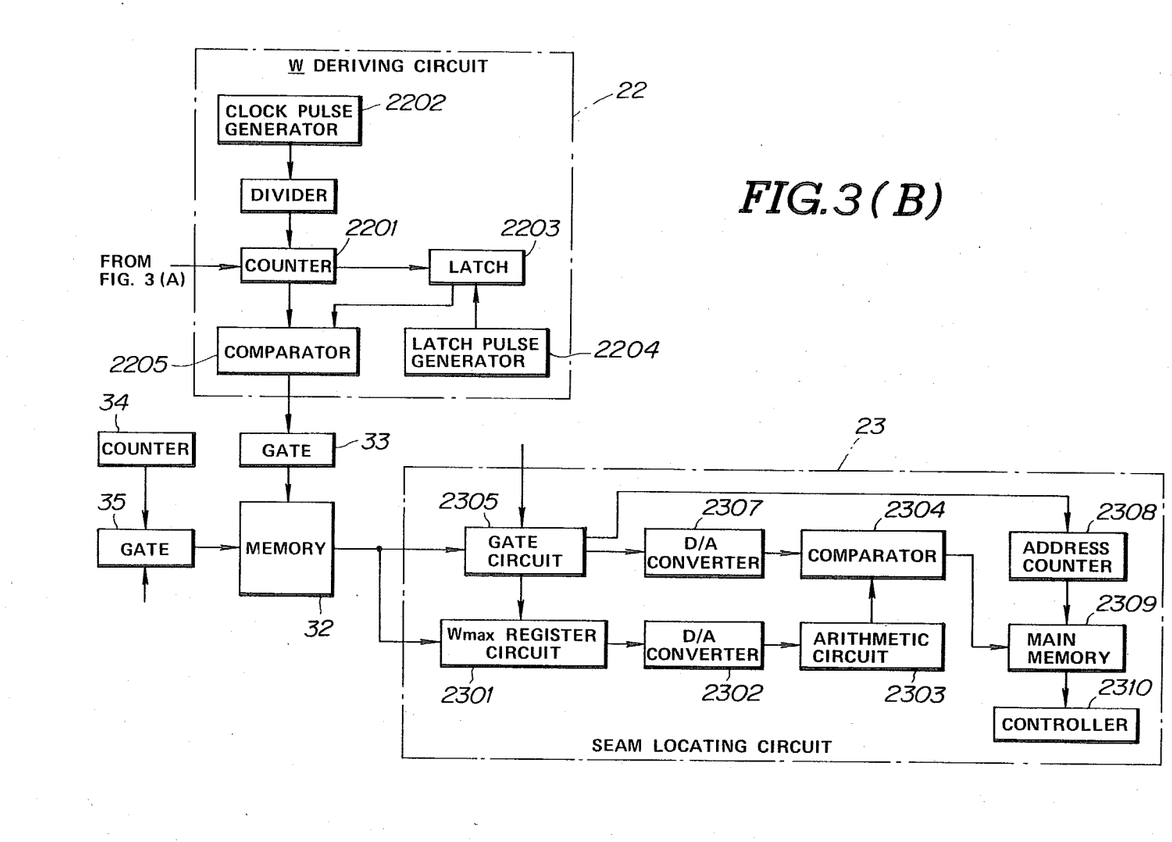

FIGS. 3(A) and 3(B) form a detailed functional diagram for the above signal processing circuit of FIG. 2. The scan line selecting circuit comprises a previous peak value buffer 2001, an arithmetic circuit 2002 and a comparator 2003. The peak value buffer 2001 receives the video signal from the solid-state camera 11 through a system controller circuit 11a in the camera and an amplifier 11b. The peak value buffer 2001 samples the luminosity of each pixel and holds the peak value $I_p$ of the luminosity signal for each frame. The peak value $I_o$ of the luminosity signal in each frame will be referred to hereafter as "frame peak value". The peak value buffer 2001 produces a peak value indicative signal having a value indicative of the held frame peak value $I_p$. The arithmetic circuit 2002 derives a bright-area threshold value $Th_i$ from the frame peak value $I_p$ according to the following equation:

$$Th_1 = I_p \cdot a + C_1,$$

where $a$ and $C_1$ are constants. The arithmetic circuit 2002 passes a signal indicative of the threshold value $Th_i$ to the comparator 2003.

The comparator 2003 also receives the video signal $P_i$ directly from the camera system 11, 11a, 11b. The comparator 2003 compares the threshold value $Th_1$ and the current luminosity $P_i$ of the video signal, and sends a resulting output to a gate 30. The output of the comparator 2003 indicatives whether or not the current scan line of the video frame includes pixels of luminosity greater than or equal to a luminosity level represented by the threshold value. In order words, the comparator output signls whether or not the current line is part of the bright area of this frame.

The scan line width measuring circuit 21 comprises a previous-line peak-value buffer 2101, an arithmetic circuit 2102, a comparator 2103, and a delay line 2104. The peak-value buffer 2101 holds the peak luminosity value $P_L$ from the previous scan line of this frame, and supplies that value to the arithmetic circuit 2102. As in the scan line selecting circuit 20, the arithmetic circuit 2102 derives a second threshold value $Th_2$ according to the following equation:

$$Th_2 = P_L \times \beta + C_2,$$

where $\beta$ and $C_2$ are constants.

The delay line 2104 is designed to delay transmission of the video luminosity signal $P_i$ by exactly one scan line.

The comparator 2103 receives the threshold value $Th_2$ and the delayed video signal $P_i$ for comparison. The output of the comparator 2103 indicates whether or not the current pixel is brighter than represented by the threshold value $Th_2$. Thus, the pulsewidth of the comparator output represents the width of the bright area of the current (next-to-current, actually) scan line.

Note that the delay line ensures that the selection signal from comparator 2003 corresponds to the video scan line being processed by the scan line width measuring circuit 21.

The gate 30 passes the output of comparator 2103 only when the output of comparator is HIGH ("1"), i.e. only when the current scan line is part of the bright area.

The gate circuit 30 is connected to a counter 2201 in the maximum width locating circuit 22. The counter 2201 is also connected to a clock pulse generator 2202. The counter 2201 is active while the input through the gate circuit 30 remains HIGH to count the clock pulses. The counter 2201 continuously counts clock pulses from the clock pulse generator 2202 and outputs a counter signal indicative of its counter value. The counter value of the counter 2201 represents the duration of the HIGH-level comparator signal from the comparator 2103 and thus, in turn represents the the effective width w of each horizontal scan line.

The counter 2201 is connected to a latching circuit 2203 which is, in turn, connected to a latching pulse generator 2204. The latching circuit 2203 responds to the latching pulse from the latching pulse generator 2204 by latching the counter signal value. The counter 2201 and the latching circuit 2203 are connected to a comparator 2205 to input thereto the counter signal indicative of the counter value and latched value indicative signal. The comparator 2205 compares the counter value from the counter 2201 and the latched counter value from the latching circuit 2203. If the counter value is less than or equal to the latched counter value, the comparator signal output from the comparator 2205 remains LOW. As long as the comparator signal level is LOW, the latching pulse generator 2204 remains inoperative so as not to generate a latching pulse. On the other hand, when the counter value of the counter 2201 becomes greater than the latched counter value, the comparator signal level goes HIGH to activate the latching pulse generator 2204. The latching pulse generator 2204 when activated produces a latching pulse which orders the latching circuit 2203 to replace the latched counter value with the counter value in the counter 2201.

Therefore, by updating the latched value in the latching circuit 2203 every time the counter value exceeds the latched value, the maximum value in each frame of pattern image can be found.

The latching circuit 2203 is also connected to a memory circuit 32 through a gate circuit 33. The gate circuit 33 responds to the vertical synchronization signal of the video signal by transferring the latched counter value to the memory circuit 32.

The memory circuit 32 is also connected to a counter 34 through a gate circuit 35. The counter 34 is reset by the vertical synchronization signal and counts horizontal synchronization signals. The gate circuit 35 is associated with the comparator 2205 and is rendered conductive by the HIGH-level comparator signal from the comparator 2205. The counter value of the counter 34, which represents the address of the horizontal scanning line, is taken as a memory address of the memory circuit containing the scanning line address data in response to the HIGH-level comparator signal. Therefore, for each frame, the maximum width W of the effective section and the address of the scanning line in which the maximum width W is obtained, are stored. The memory circuit 32 has a capacity for storing the maximum widths W and the scanning line addresses for a predetermined number of frames, i.e. 50 frames.

The memory circuit 32 outputs memory signals indicative of the maximum width W of successive frames in order. The memory signal is in the form of a pulse signal indicative of the stored maximum width W. The memory circuit 32 outputs the memory signals one-by-one in response to vertical synchronization signals.

In order to derive the seam center position, the seam locating circuit 23 is provided with a $W_{max}$ register circuit 2301. The $W_{max}$ register circuit 2301 receives a maximum width indicative pulse signal from the memory circuit 32. The $W_{max}$ register circuit 2301 selects the maximum width indicative pulse signal with the longest pulse period and registers the pulse period as a maximum W value ($W_{max}$). The $W_{max}$ register 2301 thus outputs a pulse signal having a pulse width corresponding to the stored maximum W, which pulse signal will be hereafter referred to as $W_{max}$ indicative signal. The $W_{max}$ indicative signal is fed to an arithmetic circuit 2303 through a digital-to-analog (D/A) converter 2303 as an analog signal indicative of the stored $W_{max}$ value. The arithmetic circuit 2303 performs the arithmetic operations needed to derive a threshold value $Th_3$ according to the following equation:

$$Th_3 = W_{max} \times \gamma + C_3$$

where $\gamma$ and $C_3$ are given constant values. The arithmetic circuit 2302 outputs a threshold indicative signal to a comparator circuit 2304.

The comparator circuit 2304 is also connected to the memory circuit 32 through a gate circuit 2305 and a D/A converter 2307 in order to receive the memory signals representative of the maximum width W of each frame. The gate circuit 2305 opens after deriving the $W_{max}$ in the $W_{max}$ register 2301 and passes the memory signals from the memory circuit 32. The memory signals passing through the gate circuit 2305 in a pulse signal form are converted into analog signals and input to the comparator circuit 2304 one-by-one. The analog signal input to the comparator circuit 2304 through the D/A converter 2307 will be hereafter referred to as "individual frame W indicative signal".

The comparator circuit 2304 compares the individual frame W indicative signal value with the threshold value and outputs a comparator signal having a value variable between HIGH and LOW levels ("1" or "0").

The gate circuit 2305 is also connected to an address counter 2308 to which it sends address data for the individual frame W indicative signals. The address data may be pulse signals of constant pulse width. The address counter 2308 counts the address data and outputs a frame address indicative signal representative of the address data of the individual frame W indicative signal for comparison with the threshold value by the comparator circuit 2304.

The comparator signal levels, i.e. "1" or "0" are stored with the corresponding frame address data from the address counter 2308 in a main memory 2309 in a seam position derivation circuit 23.

A controller 2310 is provided in the seam position derivation circuit 23. The controller 2310 also serves as the control signal generator circuit 24. The controller 2310 comprises a microprocessor for processing data in the main memory 2309 in order to derive the seam center position according to a process which will be set out below. In addition, the controller 2310 derives the sensor head position relative to the derived seam center position and produces a servo control signal for driving the sensor head drive motor 12 to reduce the deviation therebetween to zero.

Figure 4:
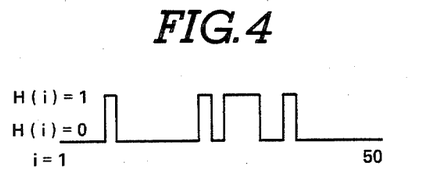
FIG. 4 is a chart showing typical output characteristics of the comparator in the seam locating circuit of FIG. 3.

FIG. 4 explanatory and graphically shows the content of the main memory 2309 of the seam position locating circuit 23. As will be appreciated herefrom, the HIGH level ("1") frequency occurs around the seam position because the higher reflectivity here than at other parts of the pipe.

In general, the controller 2310 uses the data in the main memory 2309 to detect the group of frames where HIGH level ("1") data occurs most consistently. The central address of this group of frames may be taken as the address of the point at the center of the seam.

Figure 5:
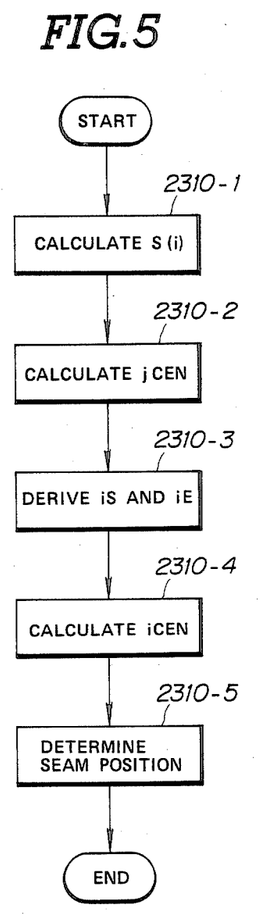
FIG. 5 is a flowchart of the seam center position derivation process.

FIG. 5 is a flowchart showing the process of derivation of the seam position by the controller. This process may be performed after scanning over all of the circumferential scanning points and storing the data in the main memory 2309. First, moving averages S(i) over a given number of frames are calculated according to the equation given below, at a block 2310-1:

$$S(i) = \sum_{i}^{i+2} H(k),$$

where H(k) is the binary comparator signal value.

Figure 6:
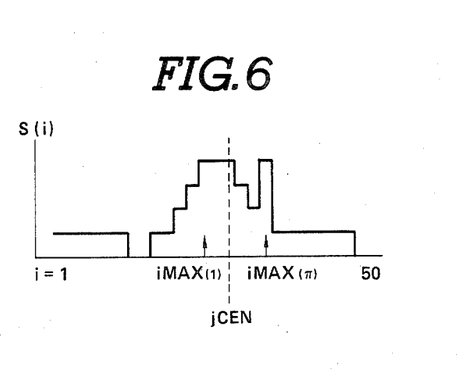
FIGS. 6 and 7 are charts illustrating derivation of the seam center position.

The result of the calculation in the block 2310-1 may be graphically illustrated as shown in FIG. 6. From the resultant moving averages, the addresses of frames at which the maximum averaged value (jMAX) was obtained are determined to determine an assumed position jCEN of the seam center according to the following equation, at a block 2310-2:

$$jCEN = \frac{1}{m} \sum_{j=1}^{m} iMax(j) + 0.5$$

where
m is the number of frames in which the maximum averaged value iMAX was obtained;
iMAX(j) are the addresses of the frames where the maximum averaged value iMAX was obtained; and
j varies from 1 to m.

Figure 7:
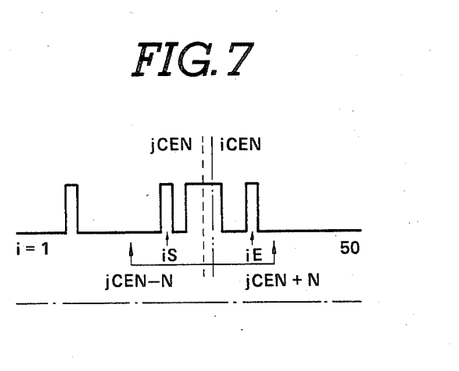

Based on the derived assumed seam center position address jCEN, an area jCEN−N to jCEN+N (N is a given value) is derived. With the derived area, the minimum address iS and maximum address iE at which the data values stored in the main memory 2309 equal "1" are found, at a block 2310-3. The seam center position iCEN is then derived according to the following equation:

$$iCEN = (iS + iE) \times 0.5 + 0.5$$

at the block 2310-4 and as shown in FIG. 7. Thereafter, an average value iAVE(i) is derived over a number of longitudinally spaced scanning sites at a block 2310-5. In block 2310-5, an absolute value of the difference between the locally derived position iCEN(i) and the average iAVE(i−1) derived in the immediately preceding scanning cycle is calculated and compared with a given value D. The given value D represents allowable deviation of the local seam center position from the average value. If the absolute value |iCEN(i)−iAVE(i−1)| is greater than the given value D, the iAVE(i−1) is used in place of as the newly derived average value iAVE(i). On the other hand, if the absolute value is less than or equal to the give value D, then the new average value iAVE(i) is use in place of the previous average value iAVE(i−1).

Step 2310-5 prevents abnormal addresses derived in the aforementioned processes of the blocks 2310-1 to 2310-4 from affecting system performance.

Figure 8:
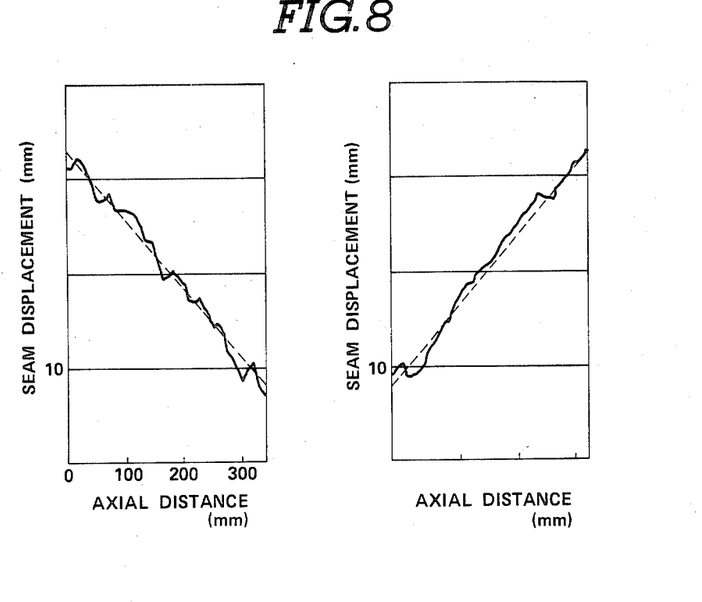
FIG. 8 is a graph of the result of an experiment on the deviation of the seam position detected by the preferred embodiment of the seam locating system, according to the invention, from to the actual seam position.
Figure 9:
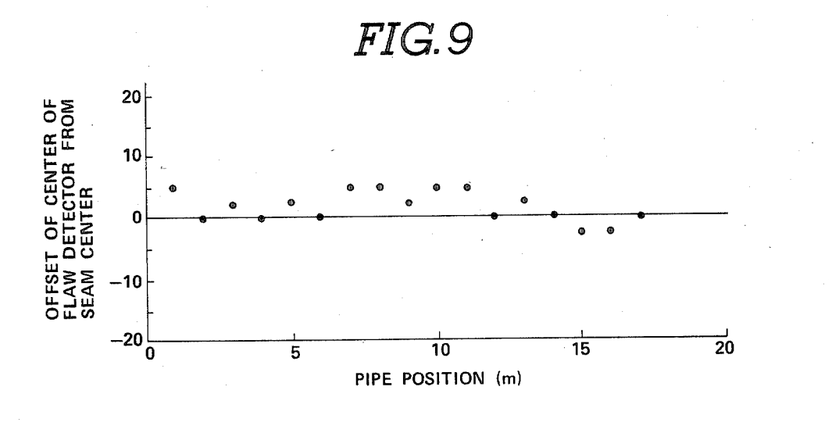
FIG. 9 is a graph of the deviation of the center of a flaw detector from the actual seam center position.

FIGS. 8 and 9 show the results of seam location by means of the preferred embodiment of the seam locating system according to the present invention. In FIG. 8, the solid lines show the seam center position derived by the preferred embodiment of the seam locating system according to the invention and the broken lines show the actual seam center position. Comparison shows that the deviation of the derived seam position from the actual seam position is ±3 mm. Such fluctuation is acceptable for annealing and/or seam inspection in seam-welded pipe manufacture.

FIG. 9 shows the deviation of the center of a flaw detector utilized for seam weld inspection and positioned under the control of the preferred embodiment of the seam locating system of the invention. As will be seen from FIG. 9, the maximum offset of the center of the flaw detector was ±5 mm. This offset shows the high accuracy of the preferred embodiment of the seam locating system according to the invention and proves practical applicablity thereof to flaw detectors and the like.

Figure 10:
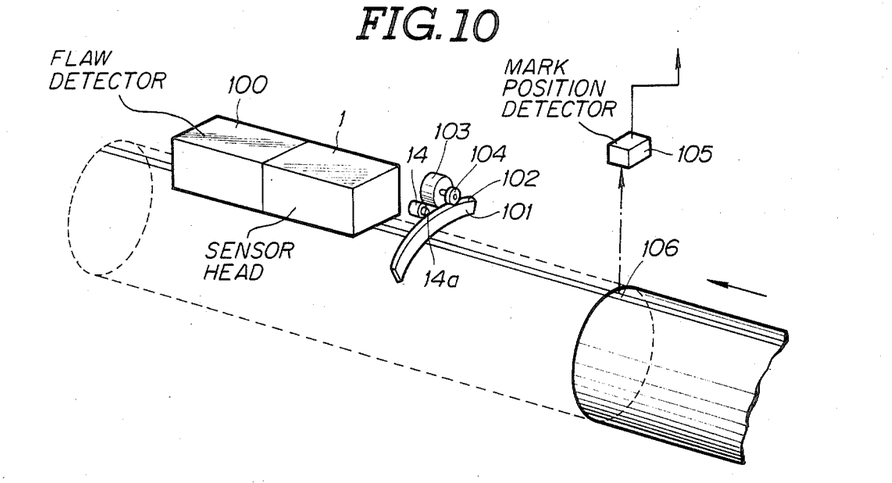
FIG. 10 is a fragmentary illustration of the preferred embodiment of a flaw detector system which includes the preferred embodiment of the seam locating system.

FIG. 10 shows the preferred embodiment of an ultrasonic flaw detector system for seam inspection, which employs the preferred embodiment of the seam locating system according to the invention. In this embodiment, the seam locating system is used to automatically align the center of the flaw detector 100 over the seam.

As will be seen from FIG. 10, the sensor head 1 of the preferred embodiment of the seam locating system is disposed upstream of an ultra-sonic flaw detector 100. The sensor head 1 and the flaw detector 100 are assembled to form a flaw detector assembly. The center of the flaw detector 100 is longitudinally aligned with the center of the sensor head 1. The flaw detector assembly is supported by an arcuate support member 101 having gear teeth 102 along its circumference. The support member 101 extends transversely to the path of the seam-welded pipe. A drive motor 103 is incorporated in the flaw detector assembly. The drive motor 103 has a drive shaft on which a drive gear 104 is fixedly mounted. The drive gear 104 drivingly engages the gear teeth 102 of the support member. As set forth above, the sensor head 1 also has the potentiometer 14 with a gear 14a engaging the gear teeth 102 of the support member. The potentiometer 14 produces the sensor head position indicative signal for feedback controlling the drive motor 103 so as to center the sensor head over the seam in the manner as set forth with respect to the preferred embodiment of the seam position locating system.

In the preferred embodiment, the flaw detector assembly is arranged downstream of a mark position detector 105 which is designed to detect a mark 106 applied to the seam at the front end of the pipe. The mark position detector 105 produces a mark position indicative signal as an initial position indicative signal which initiates flaw detection at the mark position.

The mark position detector 105 comprises a line sensor for locating the mark 106 indicative of the initial seam position. The mark position detector 105 is placed at a fixed position and consists of a plurality of optical segments circumferentially aligned at predetermined positions. Each of the optical segments is designed to output a HIGH-level signal when the mark 106 is detected.

The controller 2310 of the seam locating circuit 23 as set out with respect to FIG. 3 receives the output of the mark position detector 105. Based on the output of the mark position detector 105, the controller 2310 derives the mark position according to the process illustrated in FIG. 11.

Figure 11:
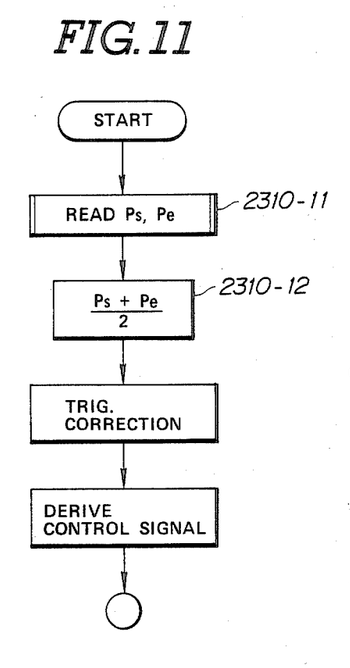
FIG. 11 is a flowchart of the process of deriving the initial position of the flaw detector.
Figure 12:
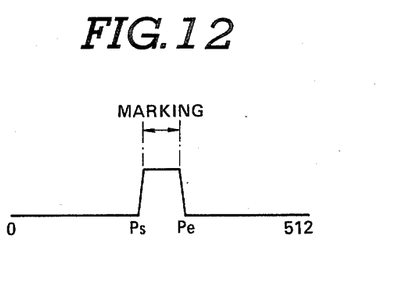
FIG. 12 is a graph of the position marking.

In FIG. 11, the leading and trailing edges of the HIGH-level output of the mark position detector 105 and positions Ps and Pe of the optical segments corresponding to the leading and trailing edges of the HIGH-level output are detected, at a block 2310-11. Based on the detected positions Ps and Pe of the optical segments, the circumferential position of the midpoint between the positions Ps and Pe is derived at a step 2310-12. The midpoint between the positions Ps and Pe is regarded as the center of the mark 106. At a block 2310-13, the derived mark position is corrected trigonometrically for the radius of curvature of the pipe. Therefore, the controller 2310 derives a control signal indicative of the driving direction and distance needed to shift the flaw detector assembly to the circumferential position corresponding to the derived center position of the mark 106, at a block 2310-14. The control signal is sent to the drive motor 103 after a given delay which is based on the feed speed of the pipe and the distance between the mark position detector 105 and the flaw detector assembly.

After positioning the flaw detector assembly at the initial circumferential position according to the output of the mark position detector 105, flaw detector 100 and the seam locating system become active for flaw detection. During flaw detection, the seam center position is detected by means of the seam locating system. The controller 2310 of the seam locating circuit 23 derives a control signal based on the offset between the sensor head position and the detected seam center position. As set forth above, since the flaw detector 100 is attached to the sensor head 1 of the seam position locating system, the flaw detector 100 shifts therewith into alignment with the seam center.

As set forth, since the deviation of the detected seam center position and the actual seam center is never more than about ±5 mm, the welded seam of the pipe can be successfully inspected by means of the flaw detector 100.

While the present invention has been disclosed in terms of the preferred embodiment in order to facilitate better understanding of the invention, it should be appreciated that the invention can be embodied in various ways without departing from the principle of the invention. Therefore, the invention should be understand to include all possible embodiments and modifications to the shown embodiments which can be embodied without departing from the principles of the invention set out in the appended claims.

What is claimed is:

1. A system for locating a seam on an elongated seam-welded pipe, comprising:
    first means for scanning a laser beam across the surface of said seam-welded pipe through a plurality of scanning points aligned circumferentially of the pipe;
    second means for receiving the laser beam reflected from each of said scanning points on said pipe surface;
    third means for recording said received laser beam in the form of a video image, one frame for each scanning point, said video image containing luminosity data for a predetermined number of pixels in each of a predetermined number of scan lines in each frame;
    fourth means for locating the width of a bright area in each frame, which bright area is made up of pixels of luminosity exceeding a predetermined value;
    fifth means for comparing said width of said bright area in each frame with a threshold value and producing a binary signal of value "1" when said width of said bright area is greater than said threshold value and of value, "0" otherwise;
    sixth means for deriving a moving average of the values of the binary signals for a given number of successive frames, determining the frames over which said averaged value was maximized and for recording the address numbers of the first and the last frames where said maximum average values were obtained; and
    seventh means for deriving the location of the center of the welded seam by finding the address of the frame intermediate said first and last frames.

2. A seam locating system as set forth in claim 1, which further comprises eighth means for locating the greatest bright area width among the video images for all of the scanning points and deriving said threshold value as a function of said greatest bright area width.

3. A seam locating system as set forth in claim 2, wherein said fourth means checks the width of the section of each scan line lying within said greatest bright area of each frame when locating said width of greatest bright area in each frame.

4. A seam locating system as set forth in claim 3, wherein said fourth means includes a memory for storing said width of said bright area of each frame together with a corresponding address of the scan line on which said width of bright area of each frame was measured.

5. A seam locating system as set forth in claim 1, wherein said seventh means assumes the center of the seam to lie at the center of said frame intermediate said first and last frames.

6. A seam locating system as set forth in claim 1, wherein said first means comprises a sensor head transmitting said laser beam toward the surface of said pipe, position sensor means for locating the position of said sensor head relative to said pipe and a drive means for driving said sensor head.

7. A seam locating system as set forth in claim 6, which further comprises ninth means for feedback controlling said drive means so as to hold said sensor head directly over the center of the seam.

8. A seam locating system as set forth in claim 1, which cooperates with a flaw detector for inspecting welded seams so as to enable said flaw detector to remain in alignment with the center of the seam.

9. A seam locating system as set forth in claim 8, wherein said flaw detector comprises an ultra-sonic flaw detector.

10. A method for locating a seam on an elongated seam-welded pipe, comprising the steps of:
    scanning a laser beam across the surface of said seam-welded pipe through a plurality of scanning points aligned circumferentially of the pipe;
    receiving the laser beam reflected from each of said scanning points on said pipe surface;
    recording said received laser beam in the form of a video image, one frame for each scanning point, said video image containing luminosity data for a predetermined number of pixels in each of a predetermined number of scan lines in each frame;

locating the width of a bright area in each frame, which bright area is made up of pixels of luminosity exceeding a predetermined value;

comparing said width of said bright area in each frame with a threshold value and producing a binary signal of value "1" when said width of said bright area is greater than said threshold value and of value "0" otherwise;

deriving a moving average of the values of the binary signals for a given number of successive frames, determining the frames over which said average value was maximized and recording the address numbers of the first and the last frames where said maximum average values were obtained; and deriving the location of the center of said welded seam by finding the address of the frame intermediate said first and last frames.

11. A method for locating the seam as set forth in claim 10, which further comprises a step of locating the greatest bright area width among the video images for all of the scanning points and deriving said threshold value as a function of said greatest bright area width.

12. A method for locating the seam as set forth in claim 11, wherein said step of locating the width of said bright area is performed by checking the width of the section of each scan line lying within said greatest bright area of each frame when locating said width of greatest bright area in each frame.

13. A method for locating the seam as set forth in claim 12, wherein said step of locating the width of the greatest bright area in each frame includes a step of storing said greatest width of said bright area of each frame with a corresponding address of the scan line from which said width of greatest bright area of each frame was obtained.

14. A method for locating seam as set forth in claim 10, wherein the position of the center of the seam is assumed to be the center of said frame intermediate said first and last frames.

15. A method for locating the seam as set forth in claim 10, which further comprises a step of locating the position of a sensor head which transmits said laser beam in relation to said pipe and feedback controlling said sensor head position based on the derived position of the center of the seam.

16. A system for locating flaws in a seam of an elongated seam-welded pipe, comprising:
a flaw detector for inspecting the pipe in order to detect flaws in the welded seam of said pipe; and
a servo-system for said flaw detector for centering said flaw detector over the seam position, which servo system comprises:
first means for scanning a laser beam across the surface of said seam-welded pipe through a plurality of scanning points aligned circumferentially of the pipe;
second means for receiving the laser beam reflected from each of said scanning points on said pipe surface;
third means for recording said received laser beam in the form of a video image, one frame for each scanning point, said video image containing luminosity data for a predetermined number of pixels in each of a predetermined number of scan lines in each frame;
fourth means for locating the width of a bright area in each frame, which bright area is made up of pixels of luminosity exceeding a predetermined value;

fifth means for comparing said width of said bright area in each frame with a threshold value and producing a binary signal of value "1" when said width of said bright area is greater than said threshold value and of value "0" otherwise;

sixth means for deriving a moving average of the values of the binary signals for a given number of successive frames, determining the frame over which said averaged value was maximized and for recording the address numbers of the first and the last frames where said maximum average values were obtained; and seventh means for deriving the location of the center of the welded seam by finding the address of the frame intermediate said first and last frames.

17. A flaw locating system as set forth in claim 16, wherein said servo-system further comprises eighth means for locating the greatest bright area width among the video images for all of the scanning points and deriving said threshold value as a function of said greatest bright area width.

18. A flaw locating system as set forth in claim 17, wherein said fourth means checks the width of the section of each scan line lying within said greatest bright area of each frame when locating said width of greatest bright area in each frame.

19. A flaw locating system as set forth in claim 18, wherein said fourth means includes a memory for storing said width of said bright area of each frame together with a corresponding address of the scan line on which said width of bright area of each frame was measured.

20. A flaw locating system as set forth in claim 16, wherein said said seventh means assumes the center of the seam to lie at the center of said frame intermediate said first and last frames.

21. A flaw locating system as set forth in claim 16, wherein said first means comprises a sensor head transmitting said laser beam toward the surface of said pipe, position sensor means for locating the position of said sensor head relative to said pipe and a drive means for driving said sensor head.

22. A flaw locating system as set forth in claim 21, which further comprises ninth means for feedback controlling said drive means so as to hold said sensor head directly over the center of the seam.

23. A method for locating flaws in a seam in an elongated seam-welded pipe, comprising the steps of:
scanning a laser beam across the surface of said seam-welded pipe through a plurality of scanning points aligned circumferentially of the pipe;
receiving the laser beam reflected from each of said scanning points on said pipe surface;
recording said received laser beam in the form of a video image, one frame for each scanning point, said video image containing luminosity data for a predetermined number of pixels in each of a predetermined number of scan lines in each frame;
locating the width of a bright area in each frame, which bright area is made up of pixels of luminosity exceeding a predetermined value;
comparing said width of said bright area in each frame with a threshold value and producing a binary signal of value "1" when said width of said bright area is greater than said threshold value and of value "0" otherwise;

deriving a moving average of the values of the binary signals for a given number of successive frames, determining the frames over which said averaged value was maximized and for recording the address numbers of the first and the last frames where said maximum average values were obtained;

deriving the location of the center of the welded seam by finding the address of the frame intermediate said first and last frames and positioning a flaw detector based on the derived position of the center of the seam so as to center said flaw detector over said seam.

24. A method for locating flaws as set forth in claim 23, which further comprises a step of locating the greatest bright area width among the video images for all of the scanning points and deriving said threshold value as a function of said greatest bright area width.

25. A method for locating flaws as set forth in claim 24, wherein said step of locating the width of said bright area is performed by checking the width of the section of each scan line lying within said bright area of each frame when locating said width of bright area in each frame.

26. A method for locating flaws as set forth in claim 25, wherein said step of locating the width of the bright area in each frame includes a step of storing said width of said bright area of each frame with a corresponding address of the scan line from which said width of bright area of each frame was obtained.

27. A method for locating flaws as set forth in claim 23, wherein the position of the center of the seam is assumed to be the center of said frame intermediate said first and last frames.

28. A method for locating flaws as set forth in claim 23, which further comprises a step of locating the position of a sensor head which transmits said laser beam in relation to said pipe and feedback controlling said sensor head position together with said flaw detector based on the derived position of the center of the seam.

29. A system for locating a seam on an elongated seam-welded pipe, comprising:

first means for scanning a light beam across the surface of said seam-welded pipe through a plurality of scanning points aligned circumferentially of the pipe;

second means for receiving the light beam reflected from each of said scanning points on said pipe surface;

third means for recording said received laser beam in the form of a video image, one frame for each scanning point, said video image containing luminosity data for a predetermined number of pixels in each of a predetermined number of scan lines in each frame;

fourth means for locating the width of a bright area in each frame, which bright area is made up of pixels of luminosity exceeding a predetermined value;

fifth means for comparing said width of said bright area in each frame with a threshold value and producing a binary signal of value "1" when said width of said bright area is greater than said threshold value and of value "0" otherwise;

sixth means for deriving a moving average of the values of the binary signals for a given number of successive frames, determining the frames over which said averaged value was maximized and for recording the address numbers of the first and last frames where said maximum average values were obtained; and seventh means for deriving the location of the center of the welded seam by finding the address of the frame intermediate said first and last frames.

30. A method of locating a seam on an elongated seam-welded pipe, comprising the steps of:

scanning a light beam across the surface of said seam-welded pipe through a plurality of scanning points aligned circumferentially of the pipe;

receiving the light beam reflected from each of said scanning points on said pipe surface;

recording said received light beam in the form of a video image, one frame for each scanning point, said video image containing luminosity data for a predetermined number of pixels in each of a predetermined number of scan lines in each frame;

locating the width of a bright area in each frame, which bright area is made up of pixels of luminosity exceeding a predetermined value;

comparing said width of said bright area in each frame with a threshold value and producing a binary signal of value "1" when said width of said bright area is greater than said threshold value and of value "0" otherwise;

deriving a moving average of the values of the binary signals for a given number of successive frames, determining the frames over which said averaged value was maximized and for recording the address numbers of the first and the last frames where said maximum average values were obtained; and deriving the locating of the center of the welded seam by finding the address of the frame intermediate said first and last frames.

31. A system for locating flaws in a seam of an elongated seam-wlded pipe, comprising:

a flaw detector for inspecting the pipe in order to detect flaws in the welded seam of said pipe; and a servo-system for said flaw detector for centering said flaw detector over the seam position, which servosystem comprises:

first means for scanning a light beam across the surface of said seam-welded pipe through a plurality of scanning points aligned circumferentially of the pipe;

second means for receiving the light beam reflected from each of said scanning points on said pipe surface;

third means for recording said received light beam in the form of a video image, one frame for each scanning point, said video image containing luminosity data for a predetermined number of pixels in each of a predetermined number of scan lines in each frame;

fourth means for locating the width of a bright area in each frame, which bright area is made up of pixels of luminosity exceeding a predetermined value;

fifth means for comparing said width of said bright area in each frame with a threshold value and producing a binary signal of value "1" when said width of said bright area is greater than said threshold value and of value "0" otherwise;

sixth means for deriving a moving average of the values of the binary signals for a given number of successive frames, determining the frame over which said averaged value was maximized and for recording the address numbers of the first and the last frames where said maximum average values were obtained; and seventh means for deriving the location of the center of the welded seam by finding the address of the frame intermediate said first and last frames.

32. A method for locating flaws in a seam in an elongated seam-welded pipe, comprising the steps of:

scanning a light beam across the surface of said seam-welded pipe through a plurality of scanning points aligned circumferentially of the pipe;

receiving the light beam reflected from each of said scanning points on said pipe surface;

recording said received light beam in the form of a video image, one frame for each scanning point, said video image containing luminosity data for a predetermined number of pixels in each of a predetermined number of scan lines in each frame;

locating the width of a bright area in each frame, which bright area is made up of pixels of luminosity exceeding a predetermined value;

comparing said width of said bright area in each frame with a threshold value and producing a binary signal of value "1" when said width of said bright area is greater than said threshold value and of value "0" otherwise;

deriving a moving average of the values of the binary signals for a given number of successive frames, determining the frames over which said averaged value was maximized and for recording the address numbers of the first and last frames where said maximum average values were obtained;

deriving the location of the center of the welded seam by finding the address of the frame intermediate said first and last frames; and positioning a flaw detector based on the derived position of the center of the seam so as to center said flaw detector over said seam.

* * * * *

UNITED STATES PATENT AND TRADEMARK OFFICE
CERTIFICATE OF CORRECTION

PATENT NO. : 4,734,766

DATED : March 29, 1988

INVENTOR(S) : Motoji Shiozumi; Yuichiro Asano; Akira Torao

It is certified that error appears in the above-identified patent and that said Letters Patent is hereby corrected as shown below:

Column 10, line 13 and line 15 the number 2303 should be 2302

Column 18, line 32 reads "deriving the locating of the center of the welded seam" should read "deriving the location of the center of the welded seam".

Signed and Sealed this

First Day of August, 1989

Attest:

Attesting Officer

DONALD J. QUIGG

Commissioner of Patents and Trademarks